(12) United States Patent
Nimura

(10) Patent No.: US 12,094,495 B2
(45) Date of Patent: Sep. 17, 2024

(54) MAGNETIC RECORDING INFORMATION PROCESSING DEVICE AND MAGNETIC RECORDING INFORMATION PROCESSING METHOD

(71) Applicant: NIDEC INSTRUMENTS CORPORATION, Nagano (JP)

(72) Inventor: Fumihiko Nimura, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 0 days.

(21) Appl. No.: 18/333,887

(22) Filed: Jun. 13, 2023

(65) Prior Publication Data

US 2023/0410839 A1 Dec. 21, 2023

(30) Foreign Application Priority Data

Jun. 17, 2022 (JP) .................................. 2022-097726

(51) Int. Cl.
*G11B 5/008* (2006.01)
*G11B 20/10* (2006.01)

(52) U.S. Cl.
CPC ........ *G11B 5/008* (2013.01); *G11B 20/10037* (2013.01)

(58) Field of Classification Search
None
See application file for complete search history.

(56) References Cited

U.S. PATENT DOCUMENTS

| | | | | |
|---|---|---|---|---|
| 4,462,048 A * | 7/1984 | Ross | ...................... | H03G 3/345 369/61 |
| 5,231,507 A * | 7/1993 | Sakata | ...................... | H04N 9/87 386/274 |
| 2007/0286048 A1* | 12/2007 | Hayashi | ........... | G11B 20/10055 369/59.24 |
| 2008/0181065 A1* | 7/2008 | Matsuda | .......... | G11B 20/10037 369/47.17 |

(Continued)

FOREIGN PATENT DOCUMENTS

JP 202026089 A 2/2020

*Primary Examiner* — Fred Tzeng
(74) *Attorney, Agent, or Firm* — CANTOR COLBURN LLP

(57) ABSTRACT

A magnetic recording information processing device which reads out information from a magnetic recording medium includes a magnetic head which reads the magnetic recording medium and outputs a magnetic reproduction waveform, an AD (analog-digital) conversion part which converts the magnetic reproduction waveform into a digital signal, a memory which accumulates the digital signal sampled at a first sampling period as data, a thinning-out processing part which samples the digital signal at a second sampling period longer than the first sampling period, a demodulation processing part which performs demodulation processing of the information, and a control part which causes the demodulation processing part to execute demodulation processing in real time based on the digital signal sampled by the thinning-out processing part. When the demodulation processing in real time has failed, the control part causes the demodulation processing part to execute demodulation processing based on the data accumulated in the memory.

10 Claims, 2 Drawing Sheets

(56) References Cited

U.S. PATENT DOCUMENTS

2015/0108216 A1* 4/2015 Nakajima ........ G11B 20/10009
235/449
2019/0279674 A1* 9/2019 Nakajima .......... G11B 20/1419
2020/0034580 A1* 1/2020 Nakajima ................ G11B 5/09

* cited by examiner

MAGNETIC RECORDING INFORMATION PROCESSING DEVICE AND MAGNETIC RECORDING INFORMATION PROCESSING METHOD

CROSS REFERENCE TO RELATED APPLICATION

The present invention claims priority under 35 U.S.C. § 119 to Japanese Application No. 2022-097726 filed Jun. 17, 2022, the entire content of which is incorporated herein by reference.

TECHNICAL FIELD

At least an embodiment of the present invention may relate to a magnetic recording information processing device and a magnetic recording information processing method which are used when information is to be read out from a magnetic recording medium such as a magnetic card.

BACKGROUND

In a magnetic recording medium such as a magnetic card, information is recorded by reversing a magnetization direction on a magnetic surface, in other words, by forming magnetization reversal. For example, a long distance between two adjacent magnetization reversals on a magnetic surface is set to be "0", and two continuous magnetization reversals with a short distance is set to be "1" and thereby, information is recorded by using two values of "0" and "1". When information recorded as described above is to be read out from a magnetic recording medium, the magnetic recording medium is conveyed in one direction with respect to a magnetic head in a state that the magnetic recording medium is brought close to the magnetic head. As a result, an induced voltage is generated in the magnetic head so that a magnetization reversal position on a magnetic surface becomes a peak, and the magnetic head outputs a signal in a magnetic reproduction waveform. Peaks included in the magnetic reproduction waveform include a peak in a positive direction (so-called mountain) and a peak in a negative direction (so-called valley), and a peak in a positive direction and a peak in a negative direction alternately appear. Therefore, analog-digital conversion (AD conversion) is performed on the magnetic reproduction waveform to detect peaks based on the obtained digital signal, and time intervals of a series of the peaks are discriminated and reading of information from the magnetic recording medium, in other words, demodulation can be performed.

In a magnetic recording information processing device such as a magnetic card reader which is used for reading of information from a magnetic recording medium, as a method for realizing a relative movement between a magnetic head and a magnetic card, two methods have been known. In other words, one method is that a magnetic recording medium is conveyed by a motor, and the other method is that a user holds a magnetic card in his/her hand to relatively move the magnetic card with respect to a magnetic head. A magnetic recording information processing device which uses the former method is easy to make a speed of a magnetic recording medium constant with respect to a magnetic head and stable demodulation can be performed. However, according to this method, a motor, conveyance rollers and the like are required and thus, a number of components increases, and it is difficult to reduce a size of the device. On the other hand, in a magnetic recording information processing device which uses the latter method in which a magnetic recording medium is moved by a hand of a user, in other words, in a manual type magnetic recording information processing device, the number of components can be reduced, a size of the device is easily reduced, and a cost of the device can be also reduced. As a manual type magnetic recording information processing device, a swipe type device, a dip type device and the like have been known.

In the present specification, a relative speed of a magnetic recording medium with respect to a magnetic head is defined and referred to as a medium-to-head speed. Especially, in a swipe type device, a medium-to-head speed is a swipe speed. In a magnetic recording information processing device, an amplitude of a magnetic reproduction waveform is proportional to a medium-to-head speed and thus, in a manual type magnetic recording information processing device in which a user moves a magnetic recording medium by his/her hand, when a medium-to-head speed is small, an amplitude of a magnetic reproduction waveform also becomes small and, as a result, it may occur that demodulation is unable to be performed adequately. In order to prevent the problem, in Japanese Patent Laid-Open No. 2020-26089 (Patent Literature 1), a technique is disclosed that, in a swipe type or a dip type magnetic recording information processing device, a magnetic reproduction waveform is amplified by two amplifiers whose amplification factors (gain) are different from each other, and the amplified signals are respectively converted into digital signals by different AD converters, and demodulation is performed by switching the digital signals outputted from the AD converters depending on an amplitude of the magnetic reproduction waveform.

In a case that reading of information is performed from a magnetic recording medium, two methods have been known, i.e., a real time demodulation in which demodulation is performed while acquiring a magnetic reproduction waveform, and a storage simultaneous demodulation in which a magnetic reproduction waveform is AD converted and temporarily stored in a memory and, after acquisition of the magnetic reproduction waveform from a magnetic recording medium is finished, demodulation is collectively performed on the data stored in the memory. The demodulation operation is performed by using a CPU (central processing unit) or a processor such as a microprocessor. Real time demodulation requires a processor capable of performing high-speed processing when a medium-to-head speed is large. On the other hand, storage simultaneous demodulation temporarily accumulates digital data after AD conversion in a memory and thus, a processor capable of performing high-speed processing is not required. However, the whole of a continuous magnetic reproduction waveform is required to accumulate in a memory and thus, when a medium-to-head speed is small in a state that a sampling rate by the AD conversion is constant, a required memory capacity becomes remarkably large. In a manual type magnetic recording information processing device, a medium-to-head speed varies largely depending on whether a user moves a magnetic recording medium slowly or quickly. Therefore, when the device is designed according to a maximum value of a medium-to-head speed, a processor capable of performing high-speed processing is required and, when the device is designed according to a minimum value of a medium-to-head speed, a memory capacity is required to increase largely. A processor capable of performing high-speed processing and a large memory capacity causes the cost of the device to increase and thus, it is not preferable for a manual type magnetic recording information processing device which is required to reduce cost. Further, in a case that an external memory is used for securing a required memory capacity, a size of the device is increased, and a bus design is required to change and thus, a board design in the device becomes difficult.

SUMMARY

In view of the problem described above, at least an embodiment of the present invention may advantageously provide a magnetic recording information processing device and a magnetic recording information processing method capable of stably reading out information from a magnetic recording medium regardless of a medium-to-head speed without increasing a cost.

According to at least an embodiment of the present invention, there may be provided a magnetic recording information processing device which reads out information from a magnetic recording medium, including a magnetic head which reads the magnetic recording medium and outputs a magnetic reproduction waveform, an AD conversion part which converts the magnetic reproduction waveform into a digital signal, a memory which accumulates the digital signal sampled at a first sampling period as data, a thinning-out processing part which samples the digital signal at a second sampling period longer than the first sampling period, a demodulation processing part which performs demodulation processing of the information, and a control part which causes the demodulation processing part to execute demodulation processing in real time based on the digital signal sampled by the thinning-out processing part and, when the demodulation processing in real time has failed, the control part causing the demodulation processing part to execute demodulation processing based on the data accumulated in the memory.

According to the magnetic recording information processing device, after a magnetic reproduction waveform is converted into a digital signal, real time demodulation is performed by using the second sampling period which is longer than the first sampling period. Therefore, as a processor which is used in demodulation, a relatively inexpensive processor can be used which is capable of coping with a medium-to-head speed in a range of a low speed through a medium speed In this case, when the medium-to-head speed is a high speed, an error occurs in real time demodulation and real time demodulation has failed. However, in this case, storage simultaneous demodulation is performed by using the data having been already accumulated in the memory. It is sufficient that the memory has only a capacity capable of storing the entire continuous magnetic reproduction waveform when the medium-to-head speed is a high speed or a medium high speed and thus, a capacity of the memory can be made relatively small. Therefore, according to the magnetic recording information processing device, reading of information can be stably performed regardless of a medium-to-head speed without increasing a cost.

In the magnetic recording information processing device in accordance with an embodiment of the present invention, it is preferable that the second sampling period is an integral multiple of the first sampling period. Further, it is also preferable that a sampling period in the AD conversion part is equal to the first sampling period. When the second sampling period or a sampling period of analog-digital conversion in the AD conversion part is set as described above, processing load can be reduced.

In the magnetic recording information processing device in accordance with an embodiment of the present invention, a magnetic recording medium is a magnetic card. An amount of information recorded in a magnetic card is specified by standards and thereby, a capacity necessary for a memory is easily estimated. Further, the magnetic recording information processing device may be a manual type magnetic recording information processing device. In a manual type magnetic recording information processing device, a user moves a magnetic recording medium such as a magnetic card by hand and thus, each time a user is going to read out information from a magnetic recording medium, medium-to-head speeds may be largely different from each other. However, according to the magnetic recording information processing device in accordance with an embodiment of the present invention, reading of information can be stably performed from a magnetic recording medium regardless of a medium-to-head speed.

According to another embodiment of the present invention, there may be provided a magnetic recording information processing method for reading out information from a magnetic recording medium, including a conversion step in which a magnetic reproduction waveform obtained by reading the magnetic recording medium with a magnetic head is converted into a digital signal, a step in which the digital signal is sampled at a first sampling period and accumulated in a memory as data, a first demodulation step in which the digital signal is sampled at a second sampling period longer than the first sampling period and demodulation of the information is performed in real time, and a second demodulation step in which, when the demodulation of the information has failed in the first demodulation step, demodulation of the information is performed by using the data accumulated in the memory.

In the magnetic recording information processing method in accordance with another embodiment of the present invention, after a magnetic reproduction waveform is converted into a digital signal, real time demodulation is performed by using a second sampling period longer than a first sampling period in a first demodulation step and, when an error occurs in the first demodulation step and the demodulation of information has failed, storage simultaneous demodulation is performed in a second demodulation step by using the data having been already accumulated in the memory. A sampling period in real time demodulation is the second sampling period which is relatively long, and high speed processing is not required in storage simultaneous demodulation. Therefore, according to the magnetic recording information processing method, a processor whose processing speed is relatively low can be used. Further, a capacity of the memory is sufficient which is capable of storing the entire continuous magnetic reproduction waveform when the medium-to-head speed is a high speed or a medium high speed and thus, a memory having a relatively small capacity can be used. Therefore, according to the magnetic recording information processing method, reading of information can be stably performed regardless of a medium-to-head speed without increasing a device cost.

In the magnetic recording information processing method in another embodiment of the present invention, it is preferable that the second sampling period is an integral multiple of the first sampling period. Further, it is also preferable that a sampling period when the magnetic reproduction waveform which is an analog signal is converted into a digital signal is set to be equal to the first sampling period. When the second sampling period or a sampling period of analog-digital conversion is set as described above, processing load can be reduced.

In the magnetic recording information processing method in accordance with another embodiment of the present invention, the magnetic recording medium is a magnetic card. An amount of information recorded in a magnetic card is specified by standards and thereby, a capacity of a memory used for storage simultaneous demodulation can be selected depending on an amount of information specified by the standards. Further, in the magnetic recording information processing method, a magnetic recording medium is relatively moved with respect to the magnetic head by a manual operation of a user. In a manual operation by a user, for example, in a swipe operation or a dip operation, each time the operation is performed, medium-to-head speeds may be largely different from each other. However, when the magnetic recording information processing method is applied, reading of information can be stably performed from a magnetic recording medium regardless of a medium-to-head speed.

Effects of the Invention

According to the embodiment of the present invention, for example, a processor whose processing speed is relatively low and memory capacity is relatively small can be used, and information can be stably read out from a magnetic recording medium over a wide range of a medium-to-head speed at a low cost.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and where like elements are numbered alike in several Figures, in which.

DETAILED DESCRIPTION

A preferred embodiment of the present invention will be described below with reference to the accompanying drawings. In the following descriptions, as an example of an embodiment of the present invention, a magnetic information medium is a magnetic card, and a magnetic recording information processing device for reading information from a magnetic recording medium is a magnetic card reader. However, a magnetic information medium to which the present invention is applied is not limited to a magnetic card, and a magnetic recording information processing device to which the present invention is applied is not limited to a magnetic card reader.

Figure 1:
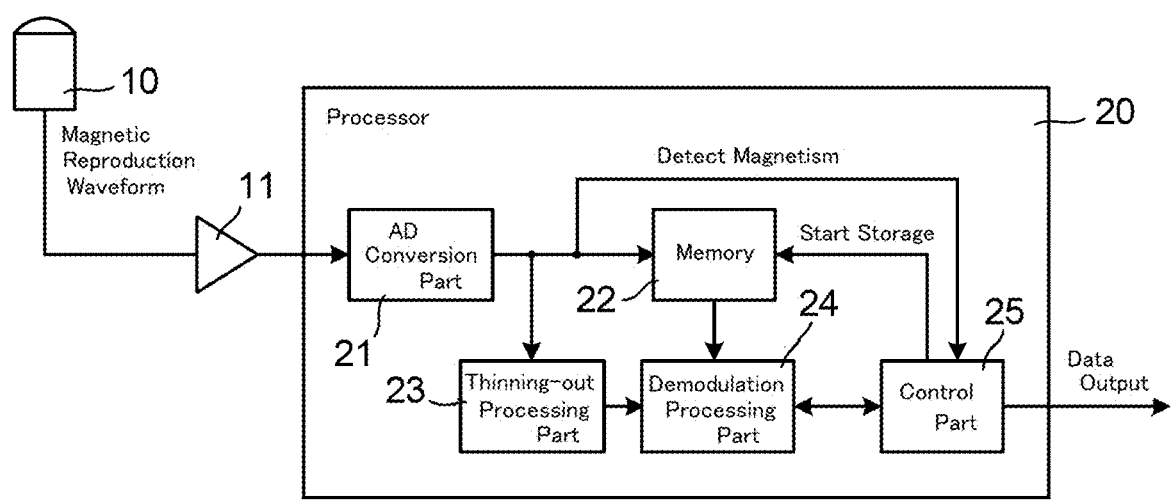
FIG. 1 is a block diagram showing a magnetic card reader in accordance with an embodiment of the present invention.

FIG. 1 is a block diagram showing a configuration of a magnetic card reader in accordance with an embodiment of the present invention. The magnetic card reader is a manual type magnetic card reader such as a swipe type or a dip type and, in this embodiment, a magnetic card reader is a swipe type. The magnetic card reader includes a magnetic head 10 which reads magnetic information recorded in a magnetic stripe of a magnetic card to output a magnetic reproduction waveform as an analog signal, an amplifier 11 which amplifies the magnetic reproduction waveform outputted from the magnetic head 10, and a processor 20 which performs analog-digital conversion (AD conversion) with respect to the amplified magnetic reproduction waveform to convert the magnetic reproduction waveform into a digital signal, and performs signal processing with respect to the digital signal to demodulate the magnetic information and output as data.

The processor 20 includes an AD conversion part 21 which performs AD conversion of a magnetic reproduction waveform, a memory 22 which is configured as a random-access memory (RAM), a thinning-out processing part 23 which thins out the digital signal after the AD conversion, a demodulation processing part 24 which demodulates magnetic information based on the digital signal obtained from the magnetic reproduction waveform, and a control part 25 which controls the entire processing relating to demodulation of magnetic information. In the memory 22, the digital signal after the AD conversion is sampled at a first sampling period and accumulated as data. In this case, in order not to unnecessarily shorten a sampling period in the AD conversion, in other words, in order not to unnecessarily increase a sampling frequency of the AD conversion, it is preferable to configure that a sampling period of the AD conversion in the AD conversion part 21 is set to be equal to the first sampling period and the digital values obtained by the AD conversion are stored in the memory 22 each time the AD conversion of a magnetic reproduction waveform is performed in the AD conversion part 21. The thinning-out processing part 23 samples the digital signal after the AD conversion at a second sampling period which is longer than the first sampling period to transmit them to the demodulation processing part 24. It is preferable that the second sampling period is set to be an integral multiple of the first sampling period. For example, the first sampling period is in an order of microsecond, and the second sampling period is set to be a length of 2 times through 10 times of the first sampling period. As an example, when the first sampling period is 5 μs (microseconds), the second sampling period is 10 μs, 15 μs or 20 μs.

In a swipe type magnetic card reader, a swipe speed or a medium-to-head speed may be largely different each time a user makes a magnetic card read. An estimated swipe speed is, for example, classified into three stages, i.e., a high speed, a medium speed and a low speed and, in addition, the medium speed is subdivided into two stages, i.e., a medium high speed set on the high speed side and a medium low speed set on the low speed side, and the first sampling period is set to a sampling period which is capable of detecting peak positions from a magnetic reproduction waveform and appropriately demodulating magnetic information when a swipe speed is the high speed. The second sampling period is set to a sampling period which is capable of detecting peak positions from a magnetic reproduction waveform and appropriately demodulating magnetic information when a swipe speed is the low speed through the medium speed, and the second sampling period may be a period which is unable to detect peak positions when a swipe speed is the high speed. A temporal length of a magnetic reproduction waveform is inversely proportional to a swipe speed. Therefore, a data capacity of the memory 22 is set to be capable of storing the entire magnetic reproduction waveform in a case that the magnetic reproduction waveform is sampled with the first sampling frequency when the swipe speed is the high speed or the medium high speed. In this case, the capacity of the memory 22 may be less than a necessary capacity for storing the entire magnetic reproduction waveform with the first sampling frequency when the swipe speed is the low speed.

Next, demodulation processing in the demodulation processing part 24 will be described below. In the thinning-out processing part 23, digital data indicating a magnetic reproduction waveform are thinned out by using the second sampling period, and the demodulation processing part 24 detects positions of peaks of the magnetic reproduction waveform in real time for the data thinned out in the thinning-out processing part 23, and demodulation of magnetic information is performed based on the detected peak positions. This processing which is referred to as a first demodulation step may fail due to processing in real time. Failure of real time demodulation is, for example, capable of being detected based on occurrence of an error such that the SS (start sentinel) or the ES (end sentinel) in magnetic information cannot be detected, or that a parity check result of data after demodulation is not correct. In demodulation of magnetic information, peaks can be correctly detected by using an appropriate sampling period which is determined according to a change speed of a magnetic reproduction waveform. In real time demodulation, in a case that a sampling period (in this case, the second sampling period) is too long with respect to an appropriate sampling period, demodulation may fail. In this embodiment, in a case that the demodulation processing part 24 has failed real time demodulation of a magnetic reproduction waveform, the demodulation processing part 24 performs storage simultaneous demodulation of the magnetic reproduction waveform as a second demodulation step by using digital data of the magnetic reproduction waveform having been already accumulated in the memory 22. The data having been accumulated in the memory 22 are data obtained by sampling a magnetic reproduction waveform at the first sampling period which is shorter than a sampling period used for real time demodulation and thus, an error due to that a sampling period is too long does not occur. According to the magnetic card reader in this embodiment, when modulation has succeeded in the first demodulation step, the demodulation data are outputted as information having been read from a magnetic card and, when demodulation has failed in the first demodulation step, the demodulation data obtained in the second demodulation step are outputted as information having been read from the magnetic card. The control part 25 controls the entire processing with regard to the demodulation of magnetic information including switching between the first demodulation step and the second demodulation step and outputs the data after demodulation, for example, to a host apparatus.

Figure 2:
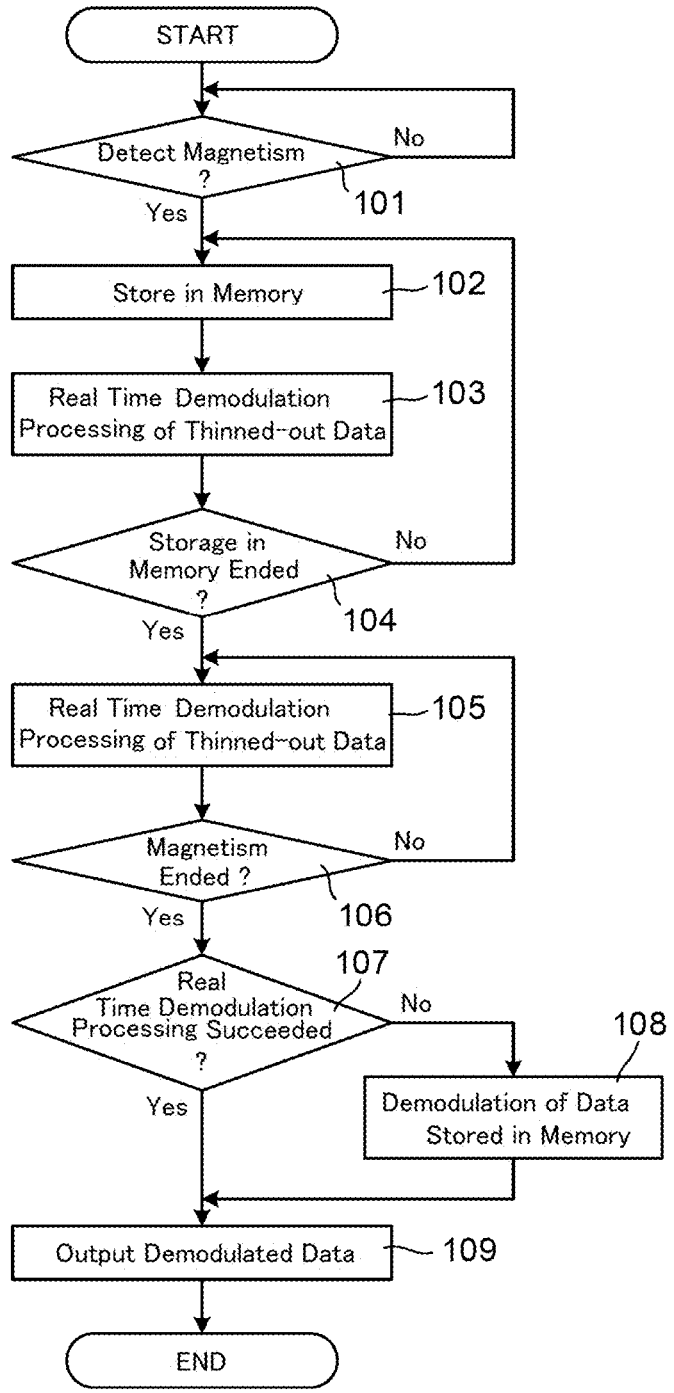
FIG. 2 is a flow chart for explaining demodulation processing of magnetic data.

The processor 20 is actually configured, for example, of a built-in microprocessor or a CPU (central processing unit), and the thinning-out processing part 23, the demodulation processing part 24 and the control part 25 are realized as functions by executing software in the microprocessor or the CPU. Next, processing in the control part 25 will be described in detail below with reference to FIG. 2 and thereby, the magnetic recording information processing device in this embodiment will be described further in detail, When a user makes a magnetic card read in the magnetic card reader by a swipe operation, variation occurs in a magnetic reproduction waveform which is outputted from the magnetic head 10 according to magnetic information recorded in the magnetic card. The control part 25 monitors an output of the AD conversion part 21 and, in the step 101, the control part 25 determines whether the magnetic head 10 detects magnetism according to magnetic information recorded in the magnetic card or not, and the control part 25 waits until the magnetic head 10 detects magnetism. When magnetism is detected, the control part 25 starts to store data outputted from the AD conversion part 21 in the memory 22. As a result, in the step 102, data of the magnetic reproduction waveform sampled at the first sampling period are stored in the memory 22 and, in the step 103, the demodulation processing part 24 executes real time demodulation (in other words, the first demodulation step) based on data which are thinned out with the second sampling frequency. The memory 22 has a limit in its capacity and thus, the control part 25 determines whether a storage capacity of the memory 22 becomes full and storage of data in the memory 22 is ended or not in the step 104 and, when storage of data in the memory 22 is not ended, the processing from the step 102 is executed repeatedly. When storage of data in the memory 22 is ended, the demodulation processing part 24 successively executes the real time demodulation in the step 105.

When reading of magnetic information from the magnetic head 10 is finished, the magnetic reproduction waveform becomes flat, and magnetism is not detected. Therefore, the control part 25 determines whether magnetism is ended or not in the step 106 and, when the magnetism is not ended, the processing is returned to the step 105 and the real time demodulation is successively executed and, when the magnetism is ended, the control part 25 determines whether the real time demodulation has succeeded or not in the step 107. When the real time demodulation has succeeded, in the step 109, the control part 25 outputs the demodulation data from the demodulation processing part 24 as output data and reading processing of information from the magnetic card is ended. On the other hand, when the control part 25 determines that real time demodulation has failed in the step 107, the control part 25 makes the demodulation processing part 24 execute storage simultaneous demodulation (in other words, the second demodulation step) by utilizing the data stored in the memory 22 in the step 108 and, after that, in the step 109, demodulation data by the storage simultaneous demodulation are outputted as output data and reading processing of information from the magnetic card is ended.

When the above-mentioned processing is executed, in this embodiment, in a case that a swipe speed is in a range of a low speed through a medium speed, demodulation of magnetic information is performed by real time demodulation and, in a case that a swipe speed is a high speed, demodulation of magnetic information is performed by storage simultaneous demodulation based on data having been already accumulated in the memory 22. Therefore, while a processing speed of the demodulation processing part 24 is relatively slow, information can be stably read out from a magnetic card even when a swipe speed is a high speed. Further, a memory can be used which has a relatively small capacity corresponding to a swipe speed in a range of a high speed through a medium high speed. As a result, according to this embodiment, while suppressing an increase of costs of a processor and a memory, information can be stably read out from a magnetic card in a wide range of a swipe speed. In an embodiment, the term such as "part" (e.g., the analog-digital conversion part, the thinning-out processing part, the demodulation processing part, the control part) as used herein is intended to mean a hardware component that performs a predetermined function. The hardware component may include a field-programmable gate array ("FPGA") or an application-specific integrated circuit ("ASIC"), for example.

The embodiment of the present invention may be configured as described below.

(1) A magnetic recording information processing device which reads out information from a magnetic recording medium including:
a magnetic head which reads the magnetic recording medium and outputs a magnetic reproduction waveform;
an AD conversion part which converts the magnetic reproduction waveform into a digital signal;
a memory which accumulates the digital signal sampled at a first sampling period as data;
a thinning-out processing part which samples the digital signal at a second sampling period longer than the first sampling period;
a demodulation processing part which performs demodulation processing of the information; and
a control part which causes the demodulation processing part to execute demodulation processing in real time based on the digital signal sampled by the thinning-out processing part and, when the demodulation processing in real time has failed, the control part causing the demodulation processing part to execute demodulation processing based on the data accumulated in the memory.

(2) The magnetic recording information processing device described in the above-mentioned (1), where the second sampling period is an integral multiple of the first sampling period.

(3) The magnetic recording information processing device described in the above-mentioned (1) or (2), where a sampling period in the AD conversion part is equal to the first sampling period.

(4) The magnetic recording information processing device described in one of the above-mentioned (1) through (3), where the magnetic recording medium is a magnetic card.

(5) The magnetic recording information processing device described in one of the above-mentioned (1) through (4), where the magnetic recording information processing device is a manual type magnetic recording information processing device.

(6) A magnetic recording information processing method for reading out information from a magnetic recording medium including:
a conversion step in which a magnetic reproduction waveform obtained by reading the magnetic recording medium with a magnetic head is converted into a digital signal;
a step in which the digital signal is sampled at a first sampling period and accumulated in a memory as data;
a first demodulation step in which the digital signal is sampled at a second sampling period longer than the first sampling period and demodulation of the information is performed in real time; and
a second demodulation step in which, when the demodulation of the information has failed in the first demodulation step, demodulation of the information is performed by using the data accumulated in the memory.

(7) The magnetic recording information processing method described in the above-mentioned (6), where the second sampling period is an integral multiple of the first sampling period.

(8) The magnetic recording information processing method described in the above-mentioned (6) or (7), where a sampling period in the conversion step is equal to the first sampling period.

(9) The magnetic recording information processing method described in one of the above-mentioned (6) through (8), where the magnetic recording medium is a magnetic card.

(10) The magnetic recording information processing method described in one of the above-mentioned (6) through (9), where the magnetic recording medium is relatively moved with respect to the magnetic head by a manual operation of a user.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A magnetic recording information processing device which reads out information recorded in a magnetic recording medium, the magnetic recording information processing device comprising:
a magnetic head which reads the magnetic recording medium and outputs a magnetic reproduction waveform of the information recorded in the magnetic recording medium;
an analog-digital conversion part which converts the magnetic reproduction waveform into a digital signal;
a memory which accumulates the digital signal sampled at a first sampling period as data;
a thinning-out processing part which samples the digital signal at a second sampling period longer than the first sampling period;
a demodulation processing part which performs demodulation processing of the information recorded in the magnetic recording medium; and
a control part which causes the demodulation processing part to execute demodulation processing in real time based on the digital signal sampled at the second sampling period by the thinning-out processing part and, when the demodulation processing in real time has failed, the control part causing the demodulation processing part to execute demodulation processing based on the data sampled at the first sampling period and accumulated in the memory.

2. The magnetic recording information processing device according to claim 1, wherein the second sampling period is an integral multiple of the first sampling period.

3. The magnetic recording information processing device according to claim 2, wherein a sampling period in the analog-digital conversion part is equal to the first sampling period.

4. The magnetic recording information processing device according to claim 1, wherein the magnetic recording medium is a magnetic card.

5. The magnetic recording information processing device according to claim 4, wherein the magnetic recording information processing device is a manual type magnetic recording information processing device.

6. A magnetic recording information processing method for reading out information recorded in a magnetic recording medium, the magnetic recording information processing method comprising:
  converting a magnetic reproduction waveform of the information recorded in the magnetic recording medium obtained by reading the magnetic recording medium with a magnetic head into a digital signal;
  sampling the digital signal at a first sampling period and accumulating the sampled digital signal in a memory as data;
  sampling the digital signal at a second sampling period longer than the first sampling period and demodulating the information in real time; and
  when the demodulating the information has failed, demodulating the information by using the data accumulated in the memory.

7. The magnetic recording information processing method according to claim 6, wherein the second sampling period is an integral multiple of the first sampling period.

8. The magnetic recording information processing method according to claim 7, wherein a sampling period in the converting the magnetic reproduction waveform is equal to the first sampling period.

9. The magnetic recording information processing method according to claim 6, wherein the magnetic recording medium is a magnetic card.

10. The magnetic recording information processing method according to claim 9,
  wherein the magnetic recording medium is relatively moved with respect to the magnetic head by a manual operation of a user.

* * * * *